Oct. 9, 1945. B. H. WILLIAMS 2,386,644
CHART
Filed April 27, 1943 2 Sheets-Sheet 1
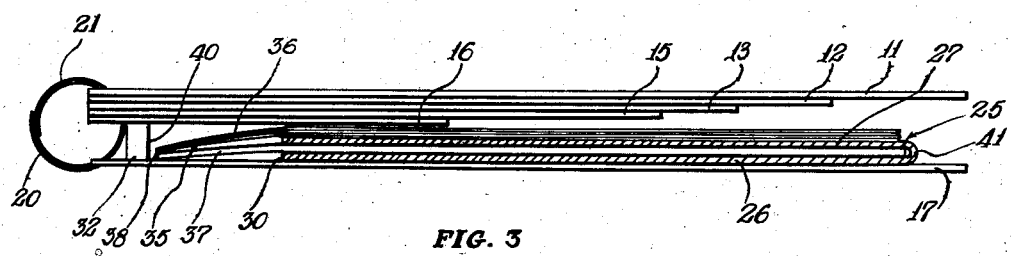
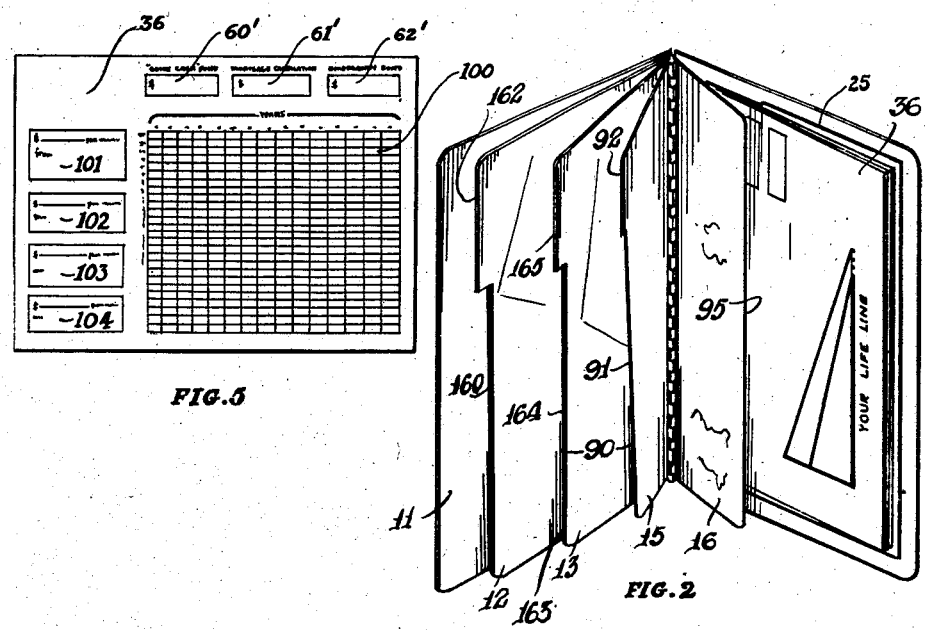
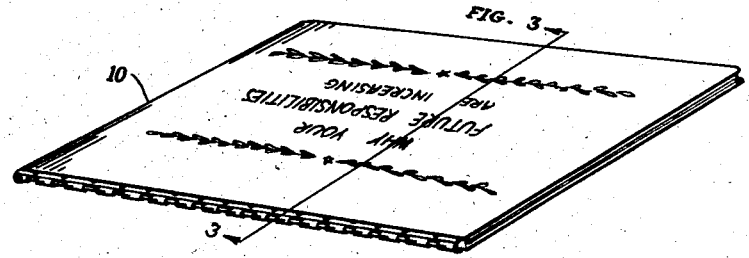
INVENTOR.
BEN H. WILLIAMS
BY
ATTORNEY Oct. 9, 1945.   B. H. WILLIAMS   2,386,644
CHART
Filed April 27, 1943   2 Sheets-Sheet 2

INVENTOR.
BEN H. WILLIAMS
BY
ATTORNEY

Patented Oct. 9, 1945

2,386,644

UNITED STATES PATENT OFFICE 2,386,644

CHART

Ben H. Williams, New York, N. Y., assignor to The Mutual Life Insurance Company of New York, New York, N. Y., a mutual life insurance company of New York Application April 27, 1943, Serial No. 484,697

4 Claims. (Cl. 35—24)

My present invention relates to charts and, more particularly, to charts made up as booklets or pamphlets having a physical arrangement and particular formation of the pages and other elements thereof to assist in the statistical analysis and the rapid and a clear presentation of graphically tabulated phenomena.

Difficulties often arise in the presentation of statistical and graphical material to a layman who is not versed in the reading of charts or tables. While it is essential that the information be presented in clear and convincing form, a great deal of resistance may be encountered by reason of the fact that the person to whom the material is presented, when shown the chart or table as a whole, may either actually or sub-consciously pretend that he follows the presented material clearly and may even be expected to resent or resist any attempt to block off portions of the chart or select portions of the chart for individual presentation or explanation.

This kind of conscious or sub-conscious resistance may arise particularly where information such as that relating to actuarial or other insurance statistics is presented to a prospective purchaser of insurance by a field underwriter. In these cases the prospective purchaser may and often does resist any attempt to go into details with respect to charts or other tables that are shown to him. Should the field underwriter attempt to draw the chart as he explains the various actuarial elements involved, the prospective purchaser may and often does interrupt the explanation of such a chart and quite often does regard the preparation of such a chart in his presence as an imposition.

The principal characteristic of my present invention is that by means thereof a previously prepared fully printed chart may be presented by the field underwriter to the prospective purchaser for examination by him and nevertheless different portions of the said chart may be presented successively to view as the field underwriter presents the successive problems involved.

A further very important characteristic of my invention is that by means of my novel book and the special physical arrangement of the pages, the chart holding means and other elements thereof, successive portions of the chart may be presented in an attractive manner accompanied by visual and oral demonstration and explanation.

Another characteristic and object of my invention is that the physical arrangement of the pages and chart holding elements of the book are such that different elements of a single chart located on a single page or on a single sheet may nevertheless be presented successively to view by the turning of successive pages.

These and many other characteristics and objects of my invention will become apparent in the following description and drawings in which:

Figure 1 is a view in perspective of one form which my novel book may take.

Figure 2 is a view in perspective of the book of Figure 1 with the pages thereof open.

Figure 3 is a cross-sectional view of my novel book taken on line 3—3 of Figure 1.

Figure 5 is a plan view of the opposite surface of the chart sheet which appears in Figure 4.

Figure 4:
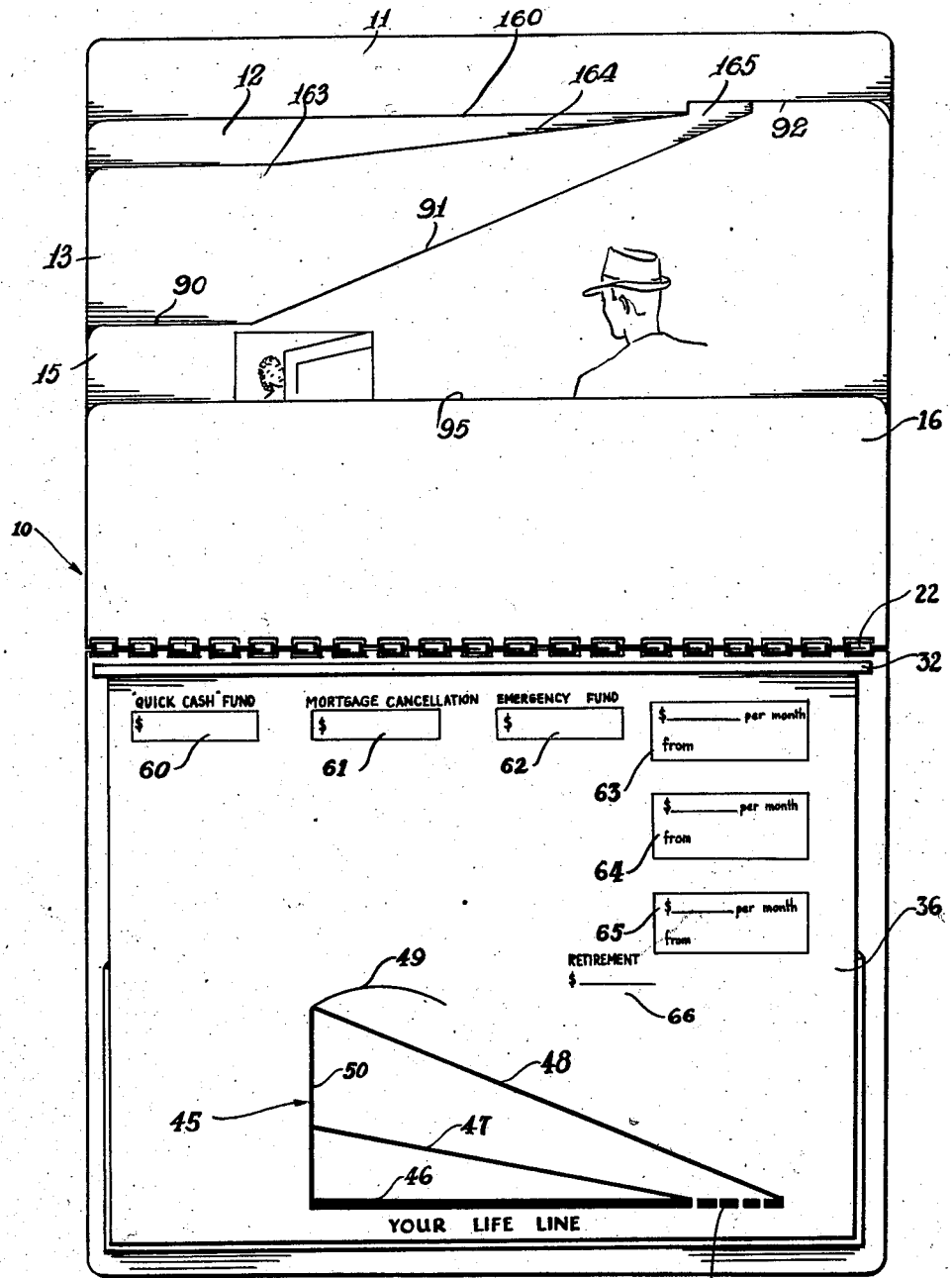
Figure 4 is a plan view showing all of the pages of the book turned to present the chart as a whole, with all of the information thereon.

Referring first to Figures 1, 2, 3 and 4, I have here shown my novel book 10 having a top page or cover 11, a second page 12, a third page 13, a fourth page 15, a fifth page or flap 16 and a bottom page or back cover 17. All of these covers and pages are bound together in any suitable manner which will permit the book to be opened flat at any point.

Preferably, the binding used is that here shown which is commonly known as a ring or spiral binder and consists of a binding support 20 having a plurality of ring-like extensions 21 passing through a similar number of registering slots 22 in each of the pages.

The inside of the surface of the back cover 17 of the book has an envelope-like container 25 having a back wall 26 which is secured to the cover 17 in surface-to-surface relation thereto in any suitable manner, preferably by adhesive.

The container or envelope 25 has a front wall 27 and side and bottom closures. The open end 30 of the envelope or container 25 is disposed parallel to and closest to the binder 20 but is nevertheless spaced therefrom, as may readily be seen from the cross-sectional view of Figure 3.

A strip 32, preferably of cardboard but which may be of any suitable material, is adhesively secured to the inside surface of the back cover 17 adjacent to the binding and spaced from the open end 30 of the envelope 25.

It will thus readily be seen that a pad 35 having a plurality of pages 36 and a supporting member 37 preferably of cardboard may now be inserted in the envelope-like container 25 and secured therein.

In order to insert the pad 35, the book 10 should be opened flat in the manner shown in Figure 4.

The heavy leaf 37 preferably of cardboard is then slipped in through the opening 30 of the envelope 25 and then pushed down as far as it will go. The top edge 38 of the heavy leaf 37 and of the pad as a whole is then snapped down so that it abuts against the surface 40 of the strip 32. In this way the pad 35 is affirmatively secured in position against accidental or unintended removal although it may readily be removed simply by flexing the end 38 upwardly.

This affirmative holding of the pad 35 is, of course best obtained when the heavy leaf or cardboard extension 37 of the pad is of a length substantially equal to or slightly less than the distance between the closed end 41 of the envelope and the surface 40 of the holding strip 32.

The pad 35 in the present embodiment consists of a plurality of leaves 36, the top one of which may readily be seen in Figure 4. Each leaf comprises a chart 45 having a plurality of lines 46, 47, 48, 49 and 50 thereon and a plurality of other chart elements 60, 61, 62, 63, 64, 65 and 66.

In the course of presentation of a charge 45, it is useful, desirable, and in fact necessary, that the lines thereof may be presented successively accompanied by visual and oral information. In fact, should such a chart be shown as a whole to a prospective purchaser of insurance, his attention may very well be distracted by some of the information contained thereon or by some of the items listed thereon. For instance, he may immediately desire information as to the significance of the line 49 or he may immediately desire information as to the significance of the box 60. While all elements on the leaf 36 are of importance, it has been found necessary that these elements be presented successively. However, should the chart be shown as a whole to a prospective purchaser and should this purchaser demand information immediately as to an element appearing thereon, the significance of which could not be readily understood until preceding elements have been explained, the entire explanation and presentation of the chart is confused; and the prospective purchaser may perhaps receive an unsatisfactory reply or a reply which is at least deemed unsatisfactory by him and the usefulness of the chart is thereby dissipated.

Accordingly, my present invention provides a simple means whereby successive lines of the chart are automatically presented to view and any particular line on the chart does not appear to view until the full opportunity has been given to demonstrate and explain the significance of the preceding lines thereon.

In the course of the explanation of the chart, the book is first laid down on the table of the prospective purchaser of insurance by the field underwriter and after an appropriate preliminary explanation, the cover 11 is lifted and folded back leaving page 12 over the chart 36.

The field underwriter then explains the significance of actuarial statistics in an informal manner and points out among other things, for instance, that a man of 35 will have a life expectancy of approximately 31 years and for this purpose line 46 on the leaf 36 represents the life line; that is, the approximate number of years which the prospect can expect to live.

This demonstration is aided by suitable indicia on the upper surface of sheet 12 referring in an appropriate manner to the life line 46 and assisting in indicating the significance thereof.

While the chart 45 as a whole is blocked off and almost the entire sheet 36 is blocked off, nevertheless, the page 12 serves to bring into view the one pertinent fact which must first be explained; that is, the life expectancy of the prospective purchaser, this, of course, being explained with reference to the life line 46.

The free edge of page 12 opposite the binding is accordingly shaped in such a manner as to bring only the life line 46 into view and accordingly is provided with a recess 160 and an extension 162 which define the life line 46 and block off the remainder of the chart.

After the significance of this life line has been explained, the field underwriter, with several introductory remarks, may now introduce the second line 47 of the chart by turning the page 12 and bringing into view the back of page 12 and the front of page 13.

Since the second line 47 of the chart is at an angle to the edge of the sheet, it is necessary in order that only this line be defined that the free edge of the page 13 have a formation coinciding with and corresponding with the said line 47.

The free edge of sheet 13 is provided with a recess 163 connecting with a diagonally cut recess 164 which, in turn, connects with an extension 165.

When the book is opened in the manner above described, the lines 46 and 47 are visible. The significance of line 47 in its relation to line 46 and in its relation to the vertical or quantitative line 50 may now be explained. For purposes of the present chart, the life line 46 is drawn in terms of years and the vertical line 50 is drawn in terms of numbers or quantities; in this case, numbers of meals.

In order further to aid the explanation and to answer any questions which may arise during the presentation, the back of page 12, may be provided with tabular information of a suitable character, such as a mortality table.

The front of sheet 13 may be provided with illustrative figures and indicia.

Where, for instance, it is desired in the course of a presentation by the field underwriter to explain the significance of the life line and the necessity for insurance protection and the significance of the prospect's responsibilities to himself and to others in simple terms as, for instance, in terms of the number of meals which he may reasonably be expected to consume and for which he must reasonably provide, the line 47 thus brought into view by the turning of page 12 aids such an explanation materially, while it prevents loss of attention or distraction by the other portions of the chart.

In this case, the field underwriter by going to appropriate indicia on pages 12 and 13 may use a very simple illustrative method for the purpose of showing the manner in which the responsibilities of a prospective purchaser are decreasing from day to day rather than increasing and how it is of more value and of greater significance that protection be obtained at the present time rather than in the future.

Having completed this portion of the explanation, the field underwriter may now desire to emphasize the same and in order to do so may desire to bring into view line 48 of the chart together with the additional dotted line 80 which is an extension of the life line 46.

Accordingly, he lifts the page 13 and turns it back, thus bringing page 15 into view. Here the additional line 48 of the chart 45 has been brought into view together with the extension 80 of the life line 46. The extension 80 of the life line 46 may represent the additional life expectancy of the wife of the prospective purchaser and indicia may be provided on the surface of page 15 explaining the significance of the line 48 and of the composite life line 46—80.

In this case the prospective purchaser is readily informed in a simple manner of his additional responsibility to his wife or other dependents and the extent of his responsibility in terms of one single significant phenomenon.

It is, of course, obvious that other regularly recurring phenomena may be chosen to emphasize the significance of the line 48. The vertical line 50, instead of indicating quantities of meals, may indicate changes of clothing or recurrent expenditures for rent or other individual or composite phenomena illustrating or demonstrating the continuous cost of living.

The back of page 13, in order to aid the explanation and to obviate the necessity of referring to other pages or to other materials, may also have a mortality table marked thereon to assist the field underwriter in answering questions intelligently.

Here also it will be obvious that the free edge of page 15 is provided with a recess 90, a diagonal recess 91 communicating with the recess 90 and defining the line 48, and an extension 92. In this case it will be seen that the diagonal recess 91 defines the whole of the line 48 from one end to the other thereof and has been extended to include the full life line 46—80.

For this purpose, also, the extension 92 has been limited in width and the only portion of the leaf 36 now disclosed is the chart 45 so that a full explanation may be made of this chart and of the pertinent material thereon without presenting other elements which may cause the attention of the prospective purchaser to be distracted from the steady course of the explanation.

Having explained the significance of the chart 45 as a whole and having thus posed a problem to the prospective purchaser as to his recurrent and continuing responsibilities should he continue to live through his full life expectancy, the field underwriter may now properly proceed to the discussion of means which will enable the prospective purchaser fully to enjoy his prospective life span.

For this purpose, the field underwriter turns the page 15, bringing into view the flap 16. Flap 16 reveals only the additional indicia 66 on the chart sheet 36, which indicia relates solely to retirement. For this purpose, of course, the free edge 95 of the flap or page 16 is so cut, arranged and dimensioned as to conceal all the remaining indicia on the leaf or sheet 36.

Accordingly, the field underwriter may now explain all the advantages and necessities of retirement income, may make calculations with respect to the amounts necessary and may enter an amount finally determined upon in the area 66.

When the flap 16 is raised and turned to the position shown in Figure 4, the whole of the leaf 36 is revealed and the indicia 60—65 are brought into view. These indicia in this particular instance relate to amounts which may be required in the event of the death of the prospective purchaser.

Accordingly, the discussion of questions of retirement was entirely divorced from questions of death and thus was not impeded or distracted thereby. All questions relating to possibilities in the event of death may now be answered and decided with respect to the indicia 60—65 when the book is turned to the position of Figure 4.

The field underwriter now having fully discussed all of the preceding elements of the chart and having determined on a retirement fund and having entered the same in the area indicated by indicia 66 may now freely discuss the necessities for a quick cash fund 60 in case of death, the desirability of providing for mortgage cancellation 61 in the event of death, the desirability of an emergency fund 62 to tide the family over a critical period, and the desirability of monthly incomes for different periods of time to be entered in the indicia 63, 64 and 65, the latter three spaces being provided so that different amounts and different periods may be entered in accordance with the age of the wife and of the various children of the prospective purchaser.

Thus, for instance, a prospective purchaser having a wife and a child of 15 and another child of 12 may wish to provide an income of $200. per month to his wife for six years until his first child reaches 21 and an income of $150. per month to his wife for the next three years until his second child reaches 21, and an income of $100. per month to his wife for the period at least of her life expectancy after the first nine years.

These various items may be entered in the spaces 63, 64 and 65.

By means of the foregoing arrangement and recessing of the pages of the book so that they define portions of the chart and conceal other portions thereof, successive portions of the chart may be presented to view and discussed in a logical manner without distractions arising from those portions of the chart which should be explained only after a proper background has been laid.

The field underwriter may readily explain the significance of the term "life expectancy" and the significance of the life line portion of the chart.

He may then readily explain the significance of line 47 of the chart without distraction from other material appearing thereon. He may then readily explain the significance of line 48 and the extended life line 46—80 again without distraction by irrelevant material or by material which he might otherwise be required to explain out of order.

Having explained the significance of all these elements, he may now proceed to a full discussion of the "living value" of life insurance and "living income" or retirement fund, again without distraction from other portions of the chart and without the possibility that other portions of the chart will suggest questions out of order. And having finally completed all of these demonstrations and explanations he may proceed to an explanation and discussion of indicia 60 through 65, explaining the death benefits and privileges of life insurance and the value thereof to the family of the prospective purchaser.

As shown in Figure 5, after all these explanations have been completed the leaf 36 may be turned over and actual calculations made by means of the chart 100 and the results thereof entered in the various spaces 101, 102, 103, 104 while the additional necessary information may be entered in the spaces 60', 61', 62'.

By the means herein shown not only is there provided a simplified means for holding a chart or renewable leaflet in the back of a book but also means are provided for the successive presentation of portions of the chart in connection with an oral or visual explanation thereof and means are also provided whereby the distraction of the attention of the prospective purchaser viewing the chart is prevented and only the significant portions of the chart which are at the moment being explained are visible.

Means are also provided by which additional information may simultaneously be presented to aid in the explanation of the chart.

Various modifications and variations in the construction of my novel book and the arrangement thereof to present different types of charts or charts having different types of lines or curves thereon will of course be obvious to those skilled in the art.

I claim:

1. In combination, a book having a cover, means on said cover for positioning a chart thereon, a chart removably positioned by said means, said book having a plurality of pages overlying said chart, and a binding securing said pages and said cover in rotatable relation to each other, said chart having thereon a plurality of marks; said marks being narrow and extending across said chart in directions substantially non-perpendicular to the binding, each page having an edge portion corresponding in shape and length to a mark on said chart, the page closest to said chart having an edge similarly corresponding to a mark, the mark on said chart most closely adjacent to said binding being visible beyond the edge of said page; successive pages above said first mentioned page having edges similarly corresponding to respective marks and located successively farther from said binding, and each edge leaving its corresponding mark in view.

2. In combination, a book having a cover, means on said cover for positioning a chart thereon and a chart removably positioned by said means, said book having a plurality of pages overlying said chart, a binding securing said pages and said cover in rotatable relation to each other, a plurality of marks on said chart; said marks being narrow and extending across said chart in directions substantially non-perpendicular to the binding, each page having an edge defining a mark on said chart; the page closest to said chart having an edge defining the boundary of the mark on said chart most closely adjacent to said binding, said mark being visible beyond the edge of said page, successive pages above said first mentioned page having edges defining in a similar manner the boundaries of the marks successively removed from said binding, at least one of said pages carrying indicia thereon corresponding and relating to the mark defined by the edge of said page.

3. In combination, a book having a cover, means on said cover for positioning a chart thereon and a chart removably positioned by said means, said book having a plurality of pages overlying said chart, a binding securing said pages and said cover in rotatable relation to each other, a plurality of marks on said chart; said marks being narrow and extending across said chart in directions substantially non-perpendicular to the binding, each page having an edge defining a mark on said chart; the page closest to said chart having an edge defining the boundary of the mark on said chart most closely adjacent to said binding, said mark being visible beyond the edge of said page, successive pages above said first mentioned page having edges defining in a similar manner the boundaries of the marks successively removed from said binding, at least one of said pages carrying indicia thereon corresponding and relating to the mark defined by the edge of said page; a surface of the page adjacent to said one page carrying indicia pertinent to the indicia on said one page.

4. In combination, a book having a cover, means on said cover for positioning a chart thereon and a chart removably positioned by said means, said book having a plurality of pages overlying said chart, a binding securing said pages and said cover in rotatable relation to each other, a plurality of marks on said chart; said marks being narrow and extending across said chart in directions substantially non-perpendicular to the binding, each page having an edge defining a mark on said chart; the page closest to said chart having an edge defining the boundary of the mark on said chart most closely adjacent to said binding, said mark being visible beyond the edge of said page, successive pages above said first mentioned page having edges defining in a similar manner the boundaries of the marks successively removed from said binding, at least one of said pages carrying indicia thereon corresponding and relating to the mark defined by the edge of said page, and an extension from the said edge of said page on at least one side of said mark defining portion to conceal a portion of said chart.

BEN H. WILLIAMS.